United States Patent [19]

Tamura

[11] Patent Number: 4,537,292
[45] Date of Patent: Aug. 27, 1985

[54] FRICTION PAD ASSEMBLY FOR A DISC BRAKE

[75] Inventor: Koichi Tamura, Tokyo, Japan

[73] Assignee: Tokico Ltd., Kawasaki, Japan

[21] Appl. No.: 568,528

[22] Filed: Jan. 5, 1984

Related U.S. Application Data

[63] Continuation of Ser. No. 293,089, Aug. 17, 1981, abandoned.

[30] Foreign Application Priority Data

Aug. 20, 1980 [JP] Japan .................. 55-114148

[51] Int. Cl.³ ............... F16D 55/224; F16D 65/02
[52] U.S. Cl. ............... 188/73.39; 188/73.32; 188/73.45
[58] Field of Search ............ 188/73.32, 73.33, 73.34, 188/73.39, 73.41, 73.42, 73.44, 73.45, 18 A, 344, 205, 250 B, 26, 73.46, 73.47, 24.11

[56] References Cited

U.S. PATENT DOCUMENTS

| 3,848,709 | 11/1974 | Tourneur ................... 188/73.39 X |
| 4,022,297 | 5/1977 | Haraikawa ................. 188/344 X |
| 4,044,864 | 8/1977 | Karasudani ................ 188/73.39 |
| 4,191,278 | 3/1980 | Karasudani ................ 188/73.44 X |
| 4,214,648 | 7/1980 | Kobayashi et al. ........ 188/73.39 |
| 4,261,443 | 4/1981 | Wright ..................... 188/73.39 |
| 4,316,530 | 2/1982 | Gehlen et al. ............ 188/73.39 |
| 4,319,670 | 3/1982 | Oka et al. ................ 188/73.34 |
| 4,335,806 | 6/1982 | Lüpertz ................... 188/73.39 |
| 4,373,616 | 2/1983 | Kondo ..................... 188/73.32 X |

FOREIGN PATENT DOCUMENTS

| 2334553 | 1/1974 | Fed. Rep. of Germany . |
| 2807620 | 8/1978 | Fed. Rep. of Germany . |
| 3014057 | 10/1981 | Fed. Rep. of Germany ... 188/73.39 |
| 0009771 | 1/1977 | Japan ..................... 188/73.44 |
| 0039073 | 3/1977 | Japan ..................... 188/73.44 |
| 0024964 | 3/1978 | Japan ..................... 188/73.39 |
| 0040128 | 3/1982 | Japan ..................... 188/73.44 |
| 828961 | 2/1960 | United Kingdom . |
| 864407 | 4/1961 | United Kingdom ......... 188/73.32 |
| 1272581 | 5/1972 | United Kingdom . |
| 1384503 | 2/1975 | United Kingdom . |
| 1424976 | 2/1976 | United Kingdom . |
| 1519482 | 7/1978 | United Kingdom . |
| 2013290 | 8/1979 | United Kingdom . |
| 2013801 | 8/1979 | United Kingdom . |
| 2031537 | 4/1980 | United Kingdom ......... 188/73.45 |
| 2065249 | 6/1981 | United Kingdom . |
| 2071240 | 9/1981 | United Kingdom . |
| 2087013 | 5/1982 | United Kingdom ......... 188/73.39 |

Primary Examiner—Douglas C. Butler
Attorney, Agent, or Firm—Fleit, Jacobson, Cohn & Price

[57] ABSTRACT

A disc brake including a stationary support member, a pair of friction pads disposed on the opposite surfaces of a rotatable disc, at least one friction pad being slidably mounted on the support member. A pair of locating and guiding devices are provided between the support member and one circumferential end of the friction pad. The devices are spaced in the direction of the radius of the disc, and at least one device includes a projection and recess engagement as viewed in the direction of the axis of the disc.

3 Claims, 9 Drawing Figures

FRICTION PAD ASSEMBLY FOR A DISC BRAKE

This application is a continuation of application Ser. No. 293,089, filed Aug. 17, 1981, now abandoned.

BACKGROUND OF THE INVENTION

This invention relates to a disc brake and also to a friction pad assembly for use in the disc brake.

Conventionally, a disc brake comprises a stationary support member mounted on a body of a vehicle, and a pair of friction pad assemblies disposed on the opposite sides of a rotatable disc, wherein the friction pad assemblies are supported on the support member and are slidable in the direction of the axis of the disc. The support member usually supports the opposite ends of the friction pad assemblies in the direction of the circumference of the disc, thus the configuration of the support member is complicated, and the weight of the disc brake increases, and the fabrication of the support member is difficult and expensive.

SUMMARY OF THE INVENTION

An object of the invention is to solve the problems aforementioned and, according to the invention, the friction pad assembly for use in a disc brake is supported on the stationary support member at one end thereof in the direction of the circumference of the disc and in a cantilever style. A pair of radially (in the direction of a radius of the disc) spaced locating devices are provided between the support member and the friction pad assembly, for locating the friction pad assembly with respect to the support member while permitting the relative movement of the friction pad assembly in the direction of the axis of the disc. Preferably, the radially inner locating device includes a radial projection and a correspondingly shaped recess.

The radially outer locating device may include a pin and a bore.

According to the invention, the construction of the support member is simplified and the weight of the disc brake can be reduced.

Further objects and advantages of the invention will become apparent from the following description taken in conjunction with accompanying drawings which exemplify some preferred embodiments of the invention.

DETAILED DESCRIPTION OF THE PREFERRED EMBODIMENT

Figure 1:
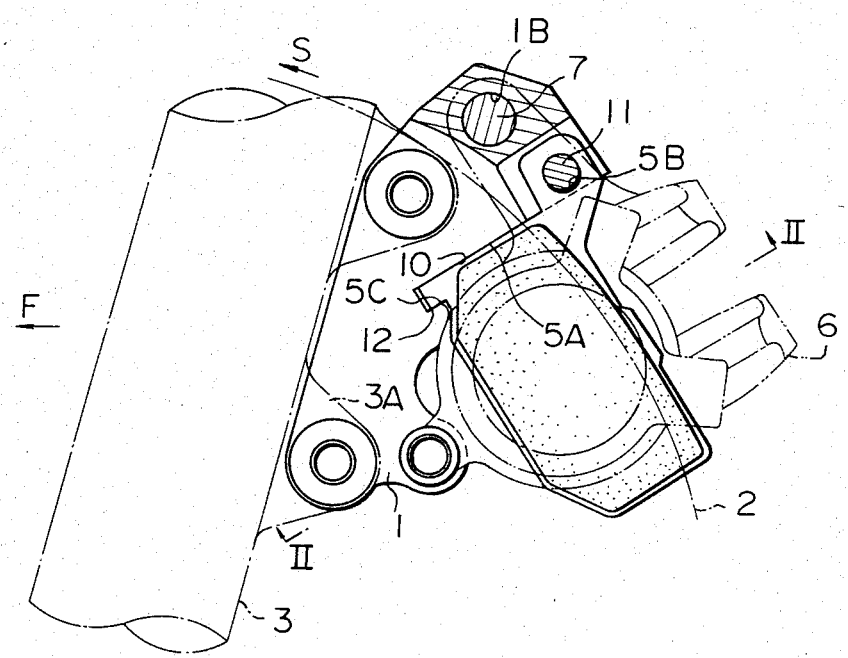
FIG. 1 is a partially sectional front view of a disc brake according to a first embodiment of the invention, which is mounted on the left side front fork of a motor cycle.
Figure 2:
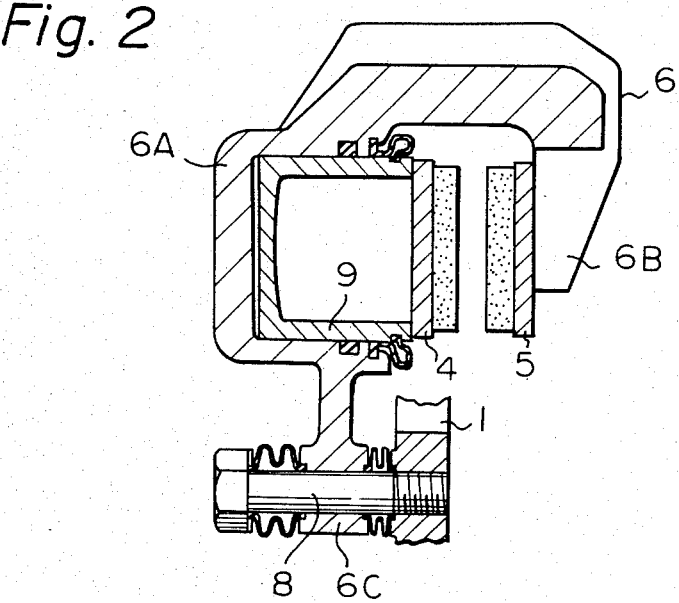
FIG. 2 is a sectional view taken along line II—II in FIG. 1.
Figure 3:
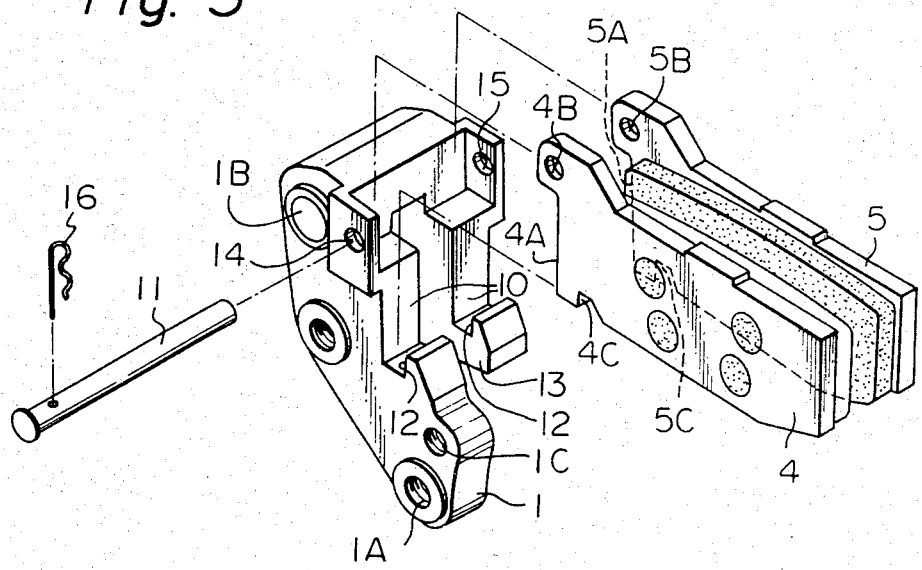
FIG. 3 is an exploded perspective view showing the support member and friction pad assemblies in the disc brake of FIG. 1.

FIGS. 1–3 show a first embodiment of the invention, wherein a stationary support member or a holder 1 is secured to a body 3 (the left side front fork of a motor cycle) of a vehicle at one side of a rotatable disc 2. The normal driving direction of the vehicle is shown by arrow F in FIG. 1, and the rotational direction of the disc 2 is shown by arrow S. On the opposite sides of the disc 2 there are provided friction pad assemblies 4 and 5, and a caliper 6 is slidably mounted on the holder 1. As shown in FIGS. 1 and 2, two pins 7 and 8 extending in the direction of the axis of the disc 2 support slidably the caliper 6 on the holder 1. The caliper 6 straddles the outer circumference of the disc 2 as shown in FIG. 2, and a piston 9 is provided in one limb 6A of the caliper 6 to press a friction pad assembly 4 against the disc 2. The other friction pad assembly 5 is pressed against the disc 2 by another limb 6B of the caliper 6. In the embodiment, the piston 9 is actuated by hydraulic pressure, however, the piston 9 may be substituted by a mechanical actuating device. The friction pad assemblies 4 and 5 comprise respectively backing plates and friction material secured to backing plates according to conventional technique.

According to the invention, the friction pad assemblies 4 and 5 are supported on the holder 1 at only one end, at the end of the friction pad assemblies closest to the exit side, based upon the forward rotation of the disc 2 in the direction of the circumference of the disc 2, and are slidable thereon in the direction of the axis of the disc. More particularly, a first supporting surface 10 is formed on the holder 1 for abutting with radially extending end surfaces 4A and 5A of the backing plates of the friction pad assemblies 4 and 5, and a pad supporting pin 11 is provided adjacent to the radially outer end of the supporting surface 10. The pad supporting pin 11 extends in the direction of the axis of the disc and passes slidably through bores 4B and 5B which are formed in the backing plates of the friction pad assemblies 4 and 5 at positions adjacent to the radially outer ends of the end surfaces 4A and 5A. Further, an axially extending recess is formed in the holder 1 which defines the radially inner end of the first supporting surface 10 and a second supporting surface 12 opposing the first supporting surface 10. Correspondingly shaped projections projecting in the radially inward direction are provided on the backing plates of the friction pad assemblies 4 and 5 to define surfaces 4C and 5C respectively to slidably engage with the second supporting surface 12. It will be noted that the pin 11 is provided radially outwards of the outer circumference of the disc 2, but the major part of the first supporting surface 10 and the second supporting surface 12 are in the rotating surface of the disc 2, thus, a circumferentially extending groove 13 is formed in the holder 1 as clearly seen in FIG. 3 so that the second surface 12 and the major part of the first surface 10 are divided respectively into axially aligned two portions. The pad supporting pin 11 is inserted through mounting holes 14 and 15 in the holder 1 and is retained by a clip 16. Screwthreads may be provided in either of the mounting holes 14 and 15 to threadingly engage with and retain the supporting pin 11.

Thus, the friction pad assemblies 4 and 5 are supported on the holder 1 in a canti-lever style with the end surfaces 4A and 5A and surfaces 4C and 5C of the backing plates thereof engaging respectively with the first and second surfaces 10 and 12 on the holder 1 such that the friction pad assemblies 4 and 5 can slide on the holder 1 in the direction of the axis of the disc 2. The first supporting surface 10 receives the braking torque from the friction pad assemblies 4 and 5 in applying the brake in the normal rotational direction of the disc 2. The second surface 12 receives the braking torque when the disc 2 rotates in the reverse direction. It will be noted that the effective area of the surface 12 is substantially smaller than that of the surface 10, however, the braking torque in the backward movement of the motor cycle is very small as compared with the braking torque generating in the normal forward movement.

When the brake is applied during the normal forward movement of the vehicle, the piston 9 presses the friction pad assembly 4 against one surface of the disc 2, and the reaction force moves the caliper 6 along the pins 7 and 8 with the limb 6B of the caliper 6 pressing the other friction pad assembly 5 against the other surface of the disc 2. The braking torque generating in friction pad assemblies 4 and 5 is transmitted directly to the first support surface 10 of the holder 1, thus, any excessive force will not act on the caliper 6 or on the pins 7 and 8. Further, it is possible to reduce or remove the force acting on the pin 11 by increasing the diameter of the holes 4B and 5B substantially larger than that of the pin 11 or by making the holes 4B and 5B in the elongated form.

When the brake is applied during the rearward movement of the vehicle, the braking torque is transmitted from friction pad assemblies 4 and 5 to the holder 1 through the second surface 12 and through the pin 11, however, since the braking torque is very small, it can satisfactorily be transmitted to the holder 1.

In changing friction pad assemblies 4 and 5, the caliper 6 is firstly dismounted from the holder 1 by extracting pins 7 and 8, then, the pin 11 is extracted. The friction pad assemblies 4 and 5 can easily be removed through the space between the first and second support surfaces 10 and 12. New friction pad assemblies are installed and assembling procedure is performed in the reverse order.

Figure 4:
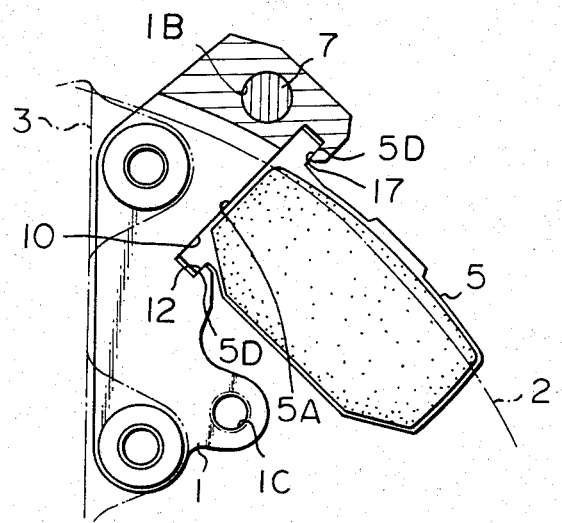
FIG. 4 is a partially broken front view of a second embodiment of the invention.
Figure 5:
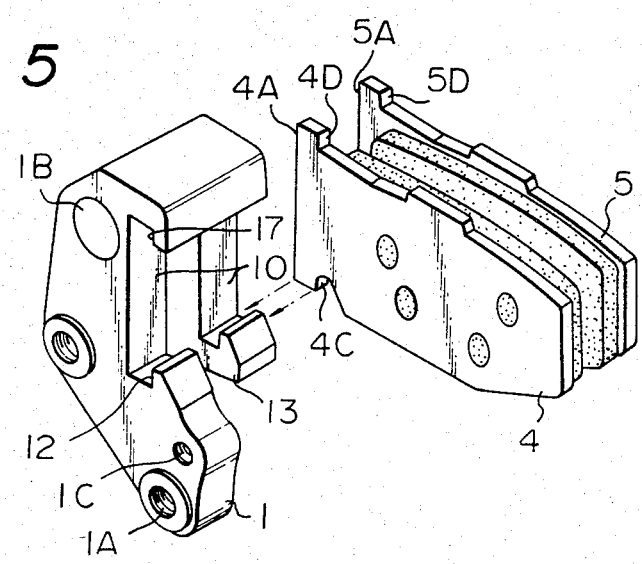
FIG. 5 is an exploded perspective view showing the essential portion of the disc brake of FIG. 4.
Figure 6:
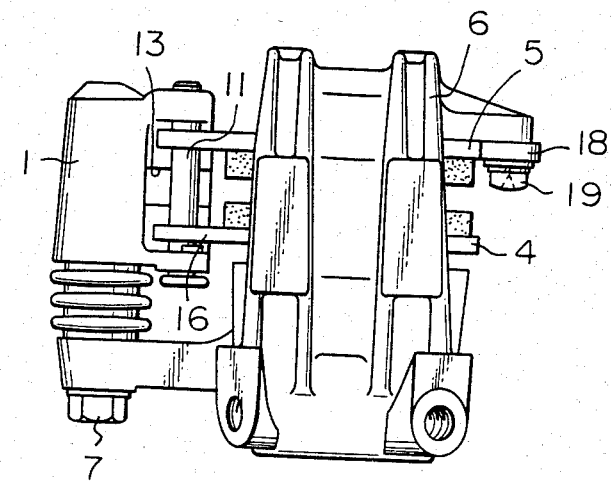
FIG. 6 is a plan view of a third embodiment of the invention.
Figure 7:
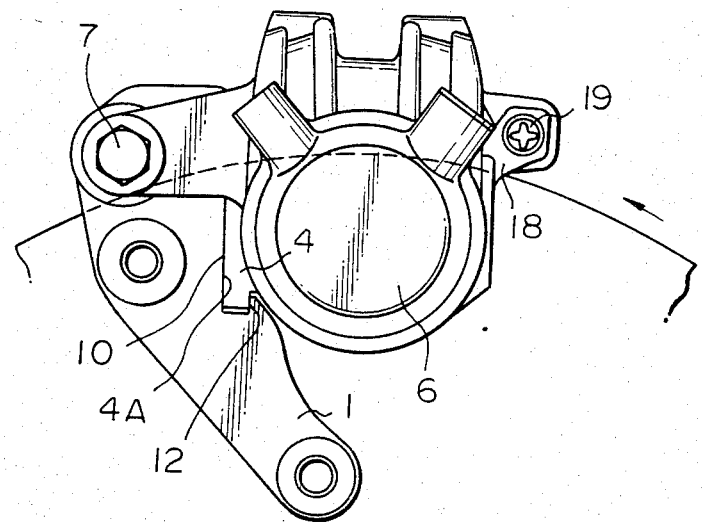
FIG. 7 is a front view of the disc brake of FIG. 6.
Figure 8:
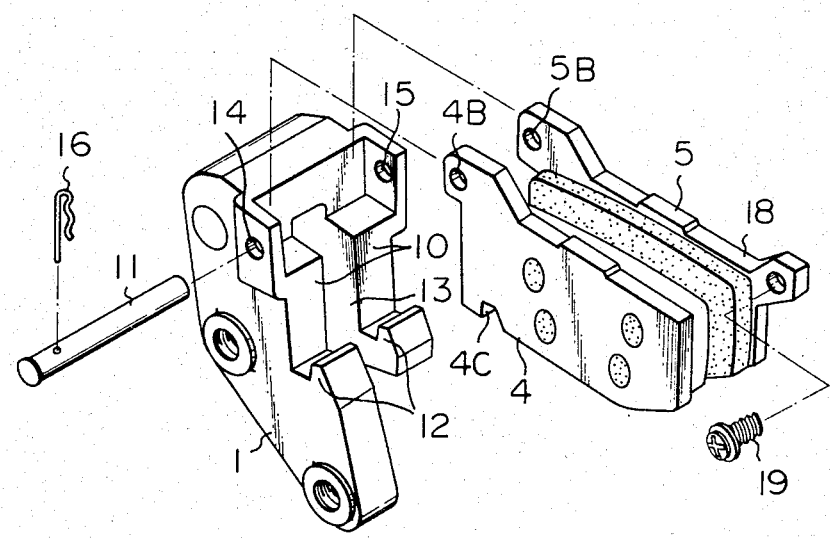
FIG. 8 is an exploded perspective view of the essential portion of the disc brake of FIG. 6.

FIGS. 4 and 5 show a second embodiment of the invention, wherein parts corresponding to the embodiment of FIGS. 1–3 are depicted by the same reference numerals. The embodiment differs from the first embodiment in that the pad supporting pin 11 is omitted. There is provided a radially inwardly directed recess or groove is formed in the holder 1 which defined the radially outer end of the first supporting surface 10 and also a third supporting surface 17 as clearly shown in the drawings. The recess slidably receives therein correspondingly shaped projections of the backing plates of respective friction pad assemblies 4 and 5. The projections define the radially outer ends of the end surfaces 4A and 5A and surfaces 4D and 5D as shown. Thus, the friction pad assemblies 4 and 5 are supported on the first, second and third supporting surfaces 10, 12 and 17 in a canti-lever style. The first supporting surface 10 receives the braking torque in the normal forward movement of the vehicle, and the second and third supporting surfaces 12 and 17 receive the braking torque in the rearward movement of the vehicle. The embodiment is advantageous over the first embodiment in that the pad supporting pin 11 is omitted thus decreasing the number of parts and simplifying the mounting and dismounting operations.

Figure 9:
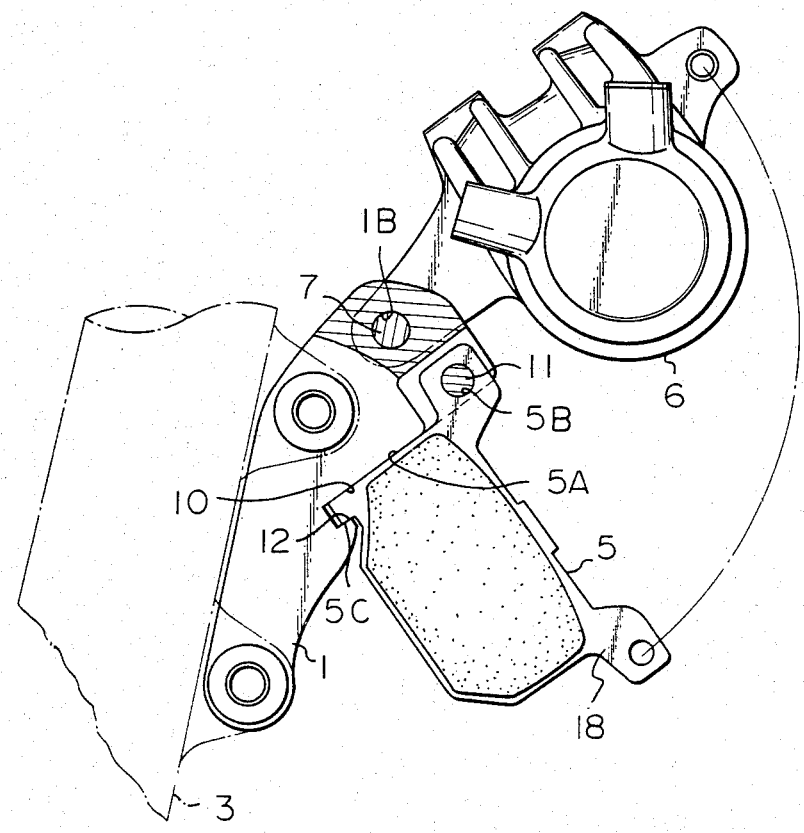
FIG. 9 is a front view of the disc brake of FIG. 6 with the caliper thereof being rotated in changing the friction pad assembly.

FIGS. 6–9 show a third embodiment of the invention wherein parts corresponding to the first embodiment shown in FIGS. 1–3 are depicted by the same reference numerals. The embodiment differs from the first embodiment in that the pin 8 is omitted. The pin 8 in the first embodiment cooperates with the pin 7 in slidably supporting the caliper 6 on the holder 1, however, the function for guiding the sliding movement of the caliper 6 is mainly performed by the pin 7 and the pin 8 acts to retain the rotational movement of the caliper 6 around the pin 7. In the third embodiment, a retaining screw 19 is provided between the backing plate 18 of the friction pad assembly 5 and the caliper 6 to retain the rotational movement of the caliper 6 around the pin 7. The friction pad assemblies 4 and 5 are mounted on the holder 1 in the manner similar to the first embodiment, thus, the braking torque is transmitted from the pad assemblies 4 and 5 to the holder 1 similarly to the first embodiment. In changing friction pad assemblies 4 and 5, the retaining screw 19 is removed and the caliper 6 is rotated around the pin 7 as shown in FIG. 9. Thus the pad changing operation can easily be performed.

It will be noted that the pad changing operation in the first and second embodiments can similarly be performed by removing the pin 8 and rotating the caliper 6 around the pin 7.

In the embodiments described the projection and recess engagement has a rectangular form, but it may have any desired form such as an arcuate or semi-circular form.

The retaining screw 19 in the third embodiment may be substituted by a projection and recess engagement between the backing plate 18 of the friction pad assembly and the limb 6B of the caliper 6. Further, such retaining means may be provided between the friction pad assembly 4 and the caliper 6, however, in such case, the retaining means must have an axially elongated form so as to permit the relative axial movement between the friction pad assembly 4 and the caliper 6.

Further, in the embodiments described, the first supporting surface 10 extends in the radial direction and contacts with the surfaces 4A and 5A along the substantial length thereof, but it is essential that the holder 1 contacts the backing plates of the pad assemblies at one of the circumferential ends of the backing plate and at portions spaced in the radial direction, i.e., the radially intermediate portions of the surface 10 and surfaces 4A and 5A may not necessarily contact with each other.

As described heretofore, according to the invention, the friction pad assembly is supported on the holder at one circumferential end thereof, thus, it is possible to reduce the weight of the holder by about one half as compared with conventional disc brake and to simplify the construction of the holder for supporting the caliper.

What is claimed is:
1. A brake pad assembly comprising:
   a brake disc;
   two brake pads located on opposite sides of the brake disc, each brake pad including a backing plate with friction material secured thereto, each said backing plate having a radial inner side, a radial outer side and opposing peripheral sides;
   a stationary brake support;

a brake caliper mounted on said brake support, said brake caliper straddling said brake disc and engaging said brake pads;

first locating means spaced radially outwardly from the periphery of the brake disc for slidingly engaging said backing plates with said brake support, said backing plates being slidable in a direction parallel to the center axis of the brake disc, said first locating means locating one of said opposing peripheral sides of the backing plates with respect to the brake support;

second locating means spaced radially inwardly from the periphery of the brake disc, said second locating means locating said one peripheral side of the backing plates with respect to the brake support, said second locating means including a projection defined by each of the backing plates, each said projection extending radially inwardly towards the center of the brake disc, and a recess defined by the brake support being shaped complementary to each said projection for guiding the sliding movement of each said projection in the direction parallel to the center axis of the brake disc, said recess including a first abutment surface and a second abutment surface opposite one another abutting each said projection so that each of the backing plates is supported along said one peripheral side on said brake support projecting in a cantilever style toward the other peripheral side from the brake support and each of said backing plates is slidingly anchored at the first locating means and the second locating means, the effective area of the second abutment surface being substantially smaller than the effective area of the first abutment surface, said first abutment surface receiving the braking torque from the brake pads in the normal rotational direction of said brake disc and said second abutment surface receiving the braking torque from the brake pads in the reverse rotational direction of said brake disc.

2. A brake pad assembly as claimed in claim 1, wherein said first locating means includes a pin, two bores defined by said brake support, and a bore defined by each backing plate, said pin passing through the bore of each backing plate and the bores of said brake support.

3. A brake pad assembly as claimed in claim 1, wherein said first locating means includes a projection defined by each of said backing plates and being slidingly received in a recess of complementary shape defined by said brake support.

* * * * *